US012791374B2

(12) United States Patent
Fukami

(10) Patent No.: US 12,791,374 B2
(45) Date of Patent: Nov. 10, 2026

(54) DEVICE FOR STORING LIQUID, SYSTEM FOR PROCESSING SUBSTRATE, AND METHOD FOR IDENTIFYING LIQUID LEVEL

(71) Applicant: Tokyo Electron Limited, Tokyo (JP)

(72) Inventor: Shun Fukami, Nirasaki City (JP)

(73) Assignee: Tokyo Electron Limited, Tokyo (JP)

(*) Notice: Subject to any disclaimer, the term of this patent is extended or adjusted under 35 U.S.C. 154(b) by 213 days.

(21) Appl. No.: 18/851,283

(22) PCT Filed: Mar. 17, 2023

(86) PCT No.: PCT/JP2023/010711
§ 371 (c)(1),
(2) Date: Sep. 26, 2024

(87) PCT Pub. No.: WO2023/189761
PCT Pub. Date: Oct. 5, 2023

(65) Prior Publication Data

US 2025/0216242 A1 Jul. 3, 2025

(30) Foreign Application Priority Data

Mar. 30, 2022 (JP) ................................ 2022-056967

(51) Int. Cl.
*G01F 23/22* (2006.01)
*G01F 23/00* (2022.01)

(52) U.S. Cl.
CPC .............. *G01F 23/22* (2013.01); *G01F 23/00* (2013.01); *G01F 23/226* (2013.01)

(58) Field of Classification Search
CPC ......... G01F 23/22; G01F 23/00; G01F 23/226
See application file for complete search history.

(56) References Cited

U.S. PATENT DOCUMENTS 4,186,341 A * 1/1980 Noguchi .............. G03G 15/086 340/870.18
5,697,248 A * 12/1997 Brown .................... G01F 23/28 73/290 V
7,636,059 B1 * 12/2009 Edvardsson .......... G01F 23/284 342/124
10,745,263 B2 * 8/2020 Crouse ................ B67D 1/0406
(Continued)

FOREIGN PATENT DOCUMENTS

JP 2018-179973 A 11/2018

*Primary Examiner* — Herbert K Roberts
(74) *Attorney, Agent, or Firm* — Armstrong Teasdale LLP

(57) ABSTRACT

A technique for identifying a level of a liquid in a tank based on vibration applied to the liquid is provided. In a device for storing the liquid used to process a substrate, a fin is inserted into the tank that stores the liquid. A width dimension of the fin in a direction intersecting a surface of the liquid varies according to a position in a depth direction of the liquid. A vibration applier applies the vibration to the fin. A vibration detector detects the vibration when a wave formed on a liquid surface of the liquid reaches an inner wall surface of the tank by the fin to which the vibration is applied. A liquid level identifier identifies the liquid level of the liquid in the tank based on a correspondence relationship between a magnitude of an amplitude of the detected vibration and the width dimension of the fin.

12 Claims, 13 Drawing Sheets

(56) References Cited

U.S. PATENT DOCUMENTS

| | | | | |
|---|---|---|---|---|
| 2001/0053332 | A1* | 12/2001 | Omasa | A61L 2/10 422/23 |
| 2006/0144140 | A1* | 7/2006 | Hache | G01F 23/22 73/295 |
| 2008/0117711 | A1* | 5/2008 | Omasa | C25D 5/623 366/127 |
| 2016/0059153 | A1* | 3/2016 | Smith | G01F 23/2967 210/744 |
| 2018/0203379 | A1* | 7/2018 | Ando | B01F 35/212 |
| 2020/0088561 | A1* | 3/2020 | Hidaka | B01J 4/02 |
| 2020/0182679 | A1* | 6/2020 | Olson | B64C 27/14 |
| 2021/0190574 | A1* | 6/2021 | Rourke | B41J 2/17566 |

* cited by examiner

DEVICE FOR STORING LIQUID, SYSTEM FOR PROCESSING SUBSTRATE, AND METHOD FOR IDENTIFYING LIQUID LEVEL

CROSS-REFERENCE TO RELATED APPLICATIONS

The present application is a U.S. National Stage Entry of International Patent Application No. PCT/JP2023/010711, filed Mar. 17, 2023, which claims the benefit of priority to Japanese Patent Application No. 2022-056967, filed Mar. 30, 2022, each of which is hereby incorporated herein by reference in its entirety.

TECHNICAL FIELD

The present disclosure relates to a device for storing liquid, a system for processing a substrate, and a method of identifying a liquid level.

BACKGROUND

In a semiconductor device manufacturing process, processing is performed in some cases by supplying a processing gas obtained by vaporizing a processing liquid, which is a raw material, to a semiconductor wafer (hereinafter referred to as a "wafer"), which is a substrate. In other cases, processing is performed by supplying the processing liquid in a liquid state to the wafer. In these cases, a mechanism for detecting the level of liquid stored in a tank may be required.

Patent Document 1 discloses a liquid level sensor configured so as to be mounted on an outer surface of bottles of various sizes by attaching an electrode to a knitted structure. This liquid level sensor is configured to detect the level of liquid contained in a corresponding bottle based on a change in electrostatic capacitance detected by the electrode.

PRIOR ART DOCUMENTS

Patent Documents

Patent Document 1: Japanese patent laid-open publication No. 2018-179973

The present disclosure provides some embodiments of a technique for identifying the level of liquid in a tank based on vibrations applied to the liquid.

SUMMARY

According to one embodiment of the present disclosure, a device for storing a liquid used to process a substrate includes a tank configured to store the liquid, a fin, a width dimension of which in a direction intersecting a liquid level of the liquid is configured to vary according to a position of a depth direction of the liquid, inserted into the tank, a vibration applier configured to apply a vibration to the fin, a vibration detector configured to detect the vibration when a wave formed on a surface of the liquid reaches an inner wall surface of the tank by the fin to which the vibration is applied from the vibration applier, and a liquid level identifier configured to identify a level of the liquid in the tank based on a correspondence relationship between a magnitude of an amplitude of the vibration detected by the vibration detector and the width dimension of the fin.

According to the present disclosure, the level of liquid in a tank can be identified based on vibrations applied to the liquid.

DETAILED DESCRIPTION

<Wafer Processing System>

Figure 1:
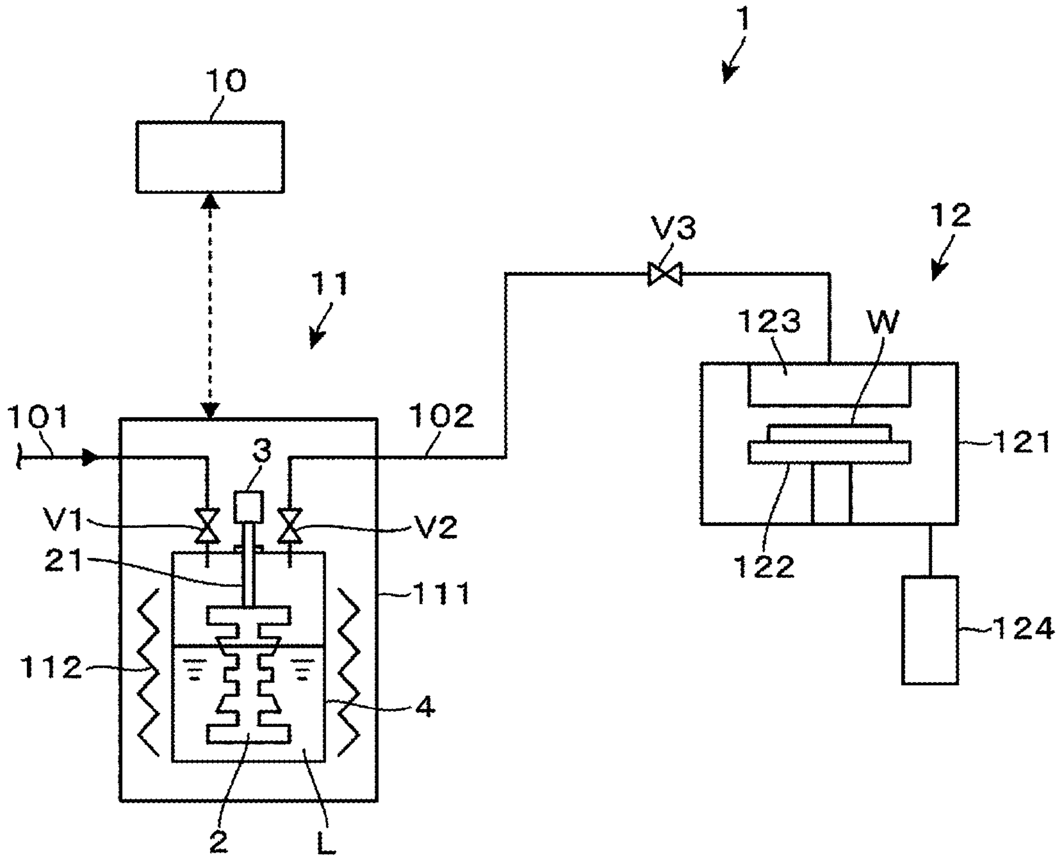
FIG. 1 is a configuration diagram of a wafer processing system according to the present disclosure.

A configuration example of a system for processing a wafer W (wafer processing system 1) of the present disclosure will now be described with reference to FIG. 1. The wafer processing system 1 is configured to perform processing of the wafer W by supplying a processing gas obtained by vaporizing liquid L, which is a raw material liquid, in a raw material liquid storage device 11 to a wafer processor 12. An example of processing performed in the wafer processor 12 includes film formation or etching.

The raw material liquid storage device 11 includes, for example, a tank 4 for storing the liquid L, a heater 112 for heating the liquid L, a cabinet 111 for accommodating the tank 4, a carrier gas supply line 101 for supplying a carrier gas to the tank 4, and a raw material gas supply line 102 for supplying the processing gas obtained by vaporizing the liquid L together with a carrier gas to the wafer processor 12. The raw material liquid storage device 11 corresponds to a "device for storing liquid" in this example and includes a mechanism for identifying the level of the liquid L stored in the tank 4. A detailed configuration of the raw material liquid storage device 11 will be described later.

In addition, the wafer processor 12 includes, for example, a processing container 121 in which the wafer W is processed, a stage 122 for holding the wafer W in the processing container 121, a gas shower head 123 for introducing the processing gas into the stage 122, and a vacuum exhauster 124 for performing vacuum exhaust of the interior of the processing container 121.

In the wafer processing system 1 having the above-described configuration, the wafer W to be processed is loaded into the processing container 121 and placed on the stage 122, and the carrier gas is introduced into the tank 4 by opening valves V1 to V3 of the carrier gas supply line 101 and the raw material gas supply line 102. The processing gas obtained by vaporizing the liquid L in the tank 4 is then supplied to the processing container 121 from the raw material gas supply line 102 via the gas shower head 123. Desired processing is performed on the wafer W by the processing gas supplied to the processing container 121, and then the processing gas is exhausted from the processing container 121 by the vacuum exhauster 124.

The raw material liquid storage device 11 constituting the wafer processing system 1 of this example is provided with the mechanism for identifying the level of the liquid L stored in the tank 4. By identifying the level of the liquid L in the tank 4, it is possible to previously discern a timing for replacing the tank 4 or to perform control such as adjustment of a heating temperature of the liquid L or a supply flow rate of the carrier gas according to the level of the liquid L.

Here, a general method of identifying the level of the liquid L in the tank 4 is to insert a float type sensor into the tank 4 and detect the liquid level corresponding to a floated height position of the sensor. However, since the float type sensor is configured to output the detected floated height position as an electrical signal, when handling flammable liquid L, it may be difficult to install the sensor in an area that comes into direct contact with the flammable liquid L or vapor of the flammable liquid L.
Further, in a method of detecting the liquid level from an outer wall surface of the tank 4 using a capacitive sensor, when another metal is present in the vicinity of an installation location of the sensor, there is a risk that the metal may affect a result of detection of the liquid level.

Therefore, the raw material liquid storage device 11 of this example applies a vibration to the liquid L in the tank 4 and detects the vibration when a wave formed on the surface of the liquid L reaches an inner wall surface of the tank 4, so that a height position of a liquid level can be identified. Hereinafter, a configuration example of the mechanism for identifying the level of the liquid L will be described with reference to FIG. 2 and FIGS. 3A and 3B.

<Fin 2>

Figure 2:
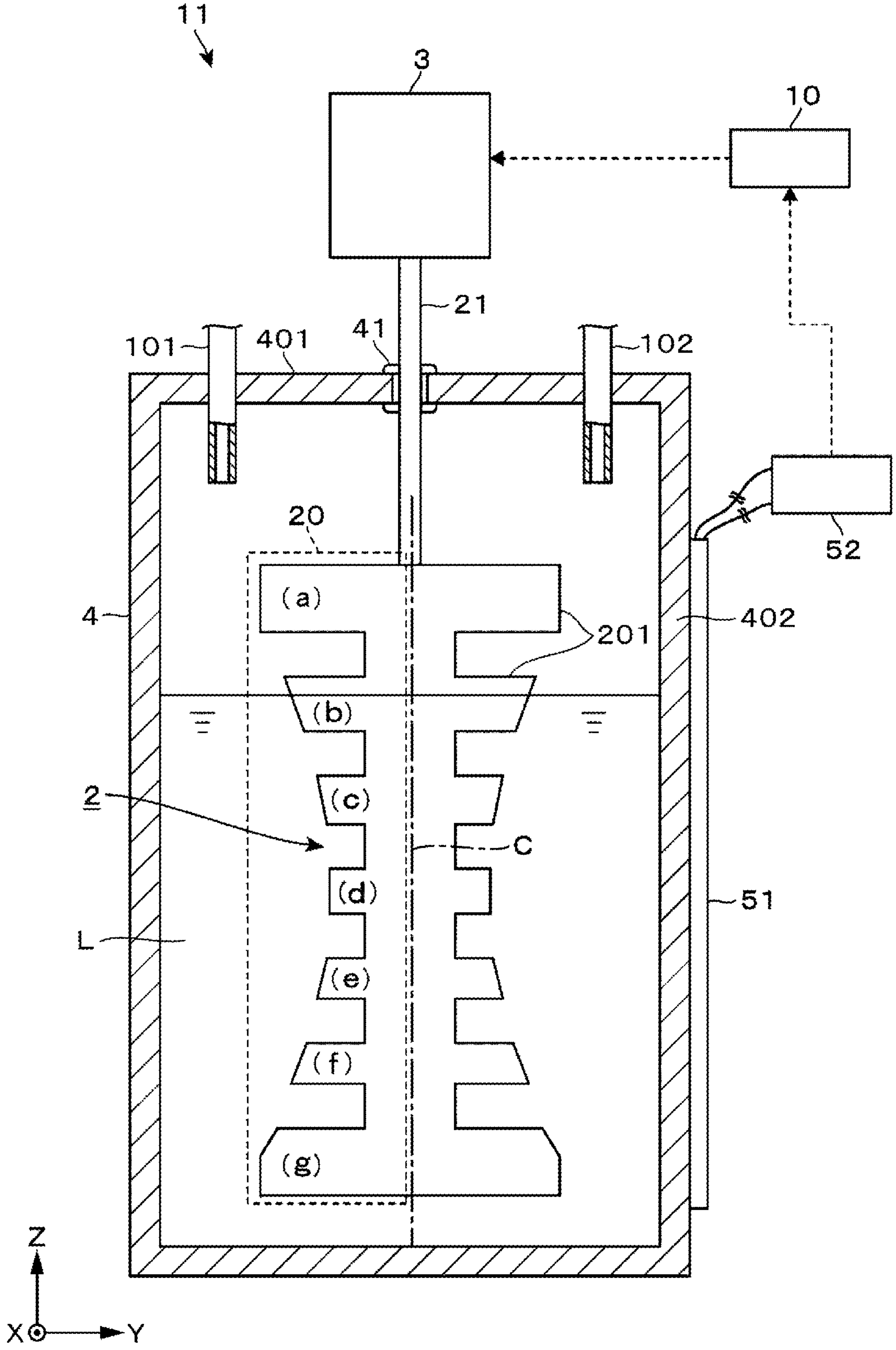
FIG. 2 is a longitudinal cross-sectional side view showing a configuration example of a raw material liquid storage device.

FIG. 2 shows a longitudinal cross-sectional side view of the tank 4 accommodated in the cabinet 111. A fin 2 is arranged in the tank 4 so as to extend in a depth direction (vertical direction) of the liquid L. The fin 2 is made of a member having rigidity such as a metal or resin and is configured such that a width dimension of the fin 2 in a direction (horizontal direction) intersecting a liquid level of the liquid L varies according to the position of a depth direction of the liquid L.

In particular, the fin 2 in examples shown in FIGS. 2, 3A and 3B, and 7 to 10 has a plurality of convex portions 201 which is a region having an increased width dimension compared to other regions. Further, the plurality of convex portions 201 is arranged at intervals from each other in a depth direction of the liquid L.

In FIGS. 2 and 7 to 10, the convex portions 201 are assigned identifying symbols (a) to (g) from the top in a sequential order. When viewed in order from the top, the convex portions 201 of (a) to (g) are configured such that width dimensions thereof become gradually decrease in order of (a)→(b)→(c)→(d) and then gradually increase in order of (d)→(e)→(f)→(g). With this configuration, the convex portions 201 of (a) and (g) with the largest width dimension are disposed at upper and lower limit locations of the depth of the liquid L stored in the tank 4. The convex portion 201 of (d) with the smallest width dimension is disposed at a central location of the depth of the liquid L.

Further, when individually viewed the convex portions 201, the width dimensions of the portions (b) and (c) become gradually smaller downward in the depth direction of the liquid, and the width dimensions of the portions (e) and (f) become gradually larger downward in the depth direction of the liquid. Further, the portion (g) of the convex portions 201 located at the lowest location is configured to have the width dimension which becomes gradually larger downward in the depth direction of the liquid and becomes constant in the middle.

Figure 3A:
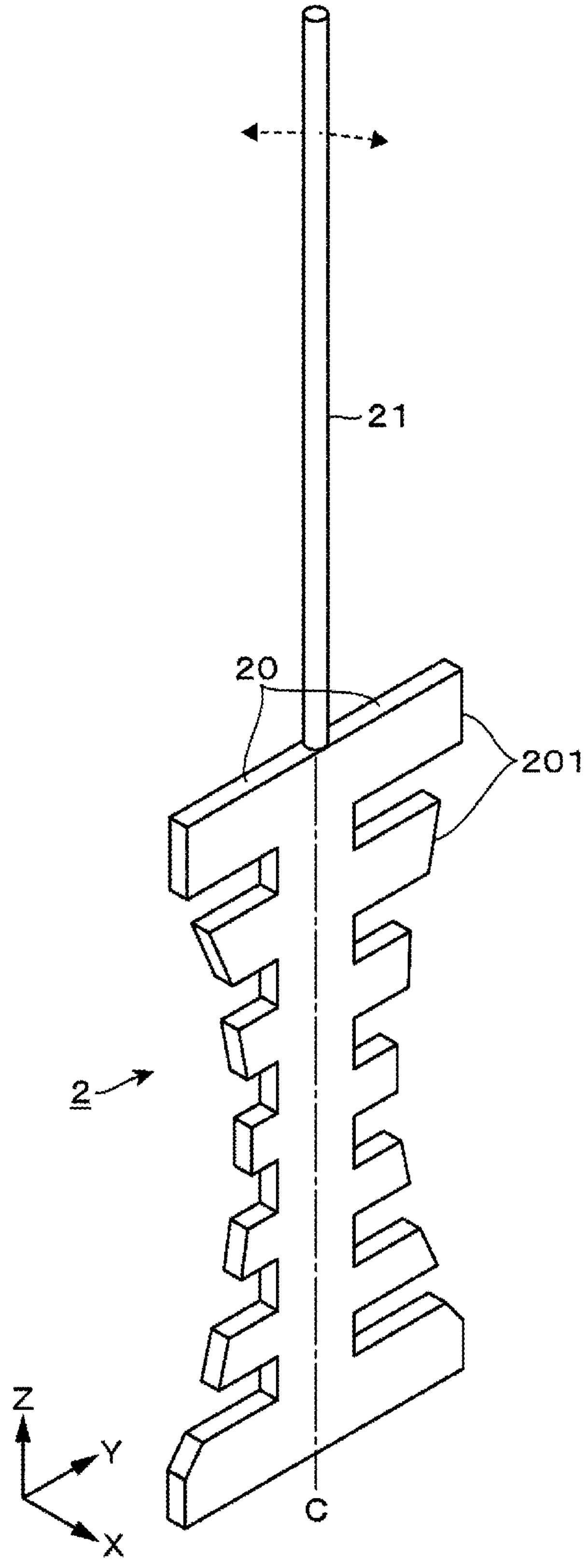
FIGS. 3A and 3B are a perspective view and a plan view showing a configuration example of a fin.
Figure 3B:
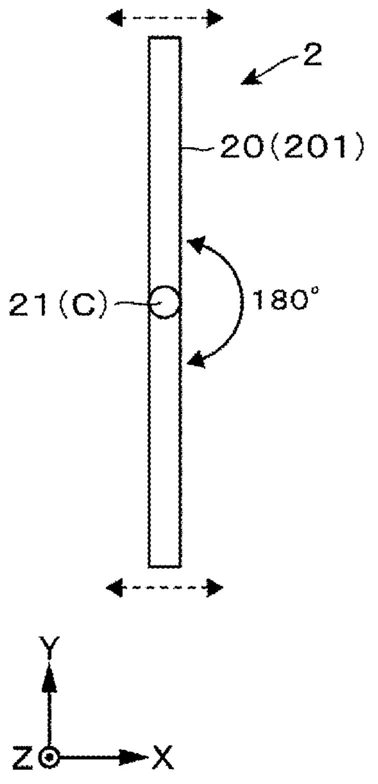

In addition, a member arranged to protrude toward a lateral side from a central axis C of the fin 2 shown by a dash-single dotted line is referred to as a "fin member 20". In FIG. 2, an arrangement area of the fin member 20 is shown by a dashed line. In this case, the fin 2 in this example may be a configuration in which two fin members 20 having congruent shapes with respect to each other are arranged in a 180-degree symmetric manner around the central axis C (FIGS. 3A and 3B).

Figure 4A:
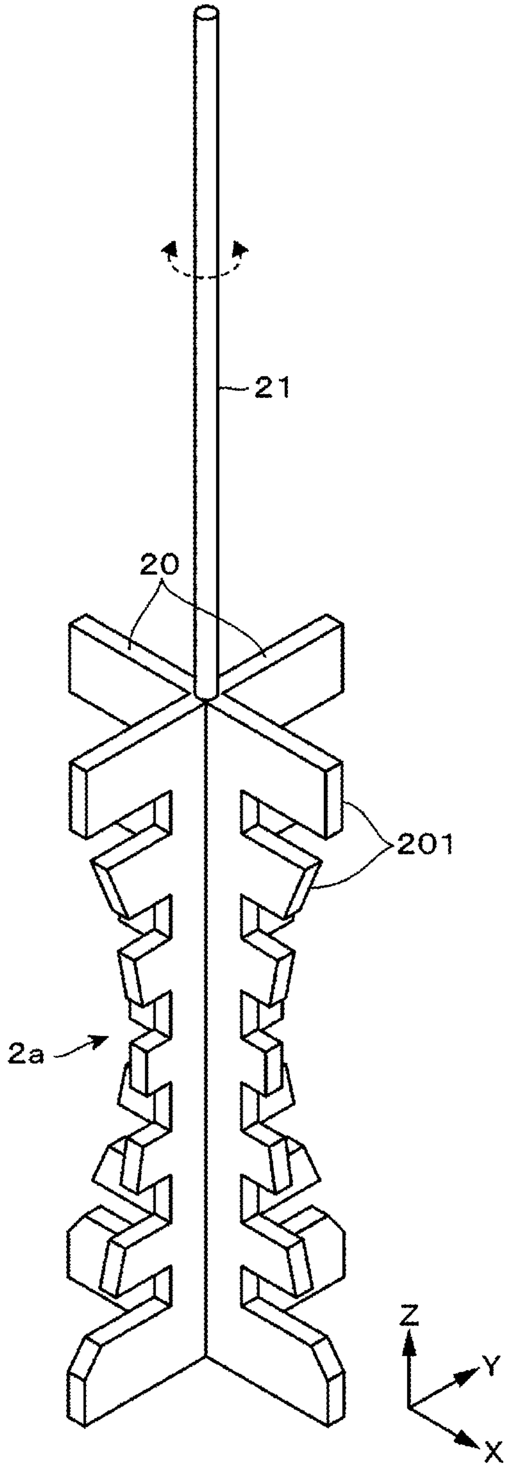
FIGS. 4A and 4B show a configuration example of a fin including four fin members.
Figure 4B:
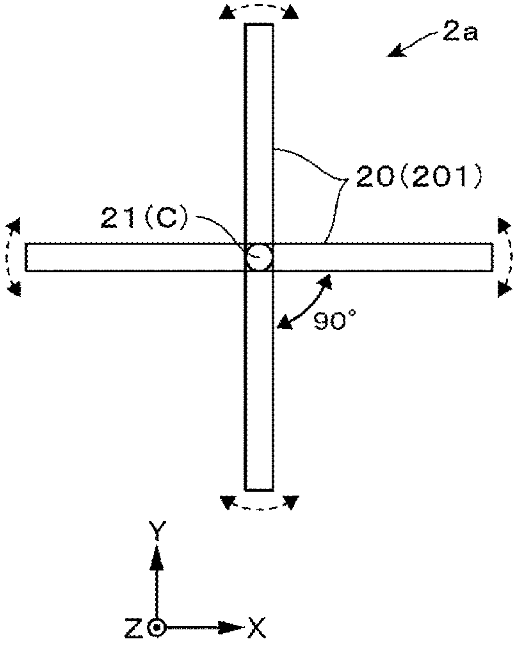
Figure 5A:
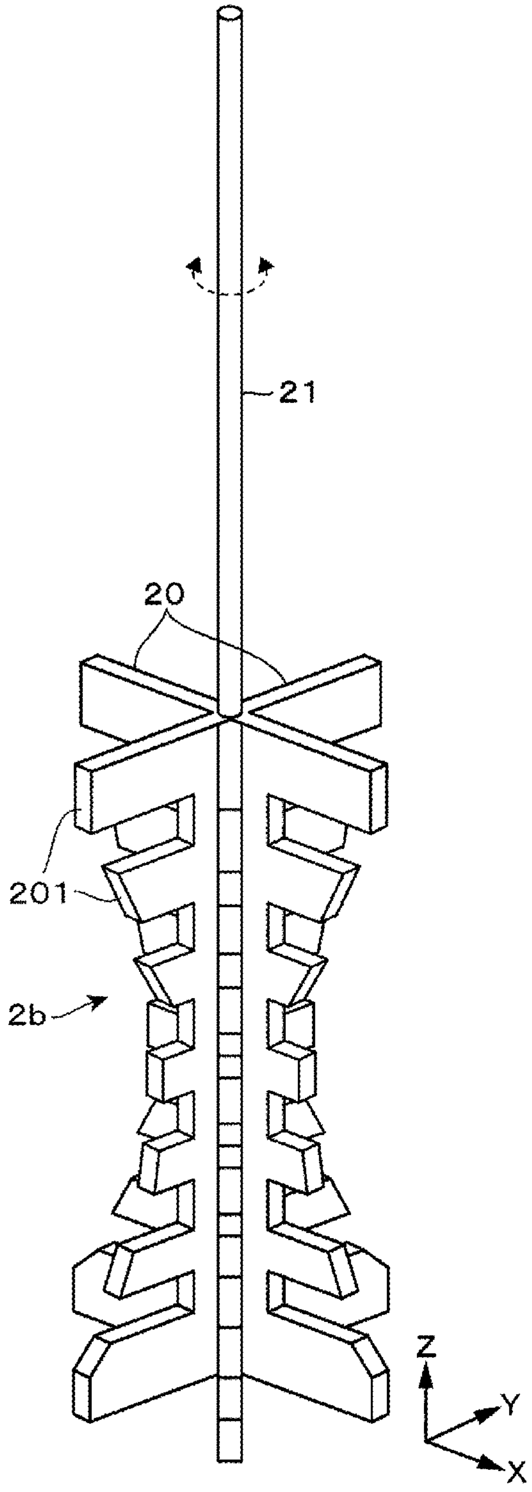
FIGS. 5A and 5B show a configuration example of a fin including six fin members.
Figure 5B:
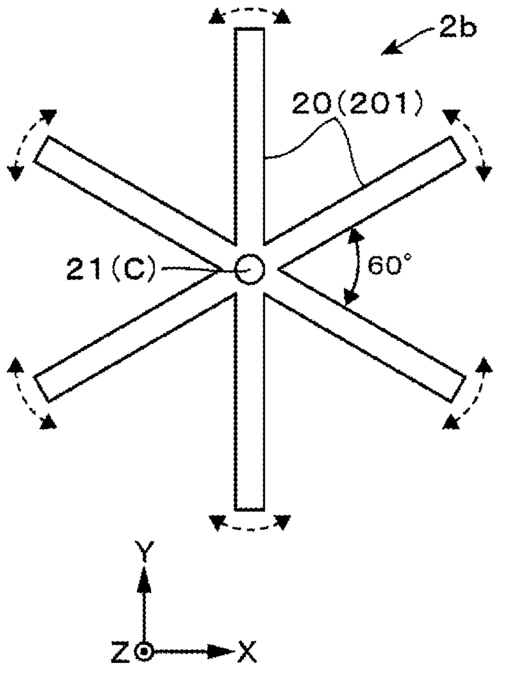

The number of the fin members 20 constituting the fin 2 is not limited to two. As shown in FIGS. 4A and 4B, a fin 2*a* in which four fin members 20 are arranged at an interval of 90 degrees may be used. In addition, as shown in FIGS. 5A and 5B, a fin 2*b* in which six fin members 20 are arranged at an interval of 60 degrees may be used.

The fin 2 configured as above is supported while being suspended by a lower end of a support rod 21 extending along the central axis C inside the liquid L. The support rod 21 penetrates a ceiling plate 401 provided on an upper surface of the tank 4 and is inserted into the tank 4. The support rod 21 is fixed at a position (fixing portion 41) at which the support rod 21 penetrates the ceiling plate 401 by, for example, welding. Therefore, the interior of the tank 4 is kept airtight, and the support rod 21 is configured so as not to move in a vertical direction or rotate around the central axis C.

<Vibration Applier 3>

As shown in FIG. 2, a vibration applier 3 for applying vibrations to the fin 2 via the support rod 21 is provided in an upper end portion of the support rod 21, which protrudes upward of the tank 4 from the ceiling plate 401.

Figure 6:
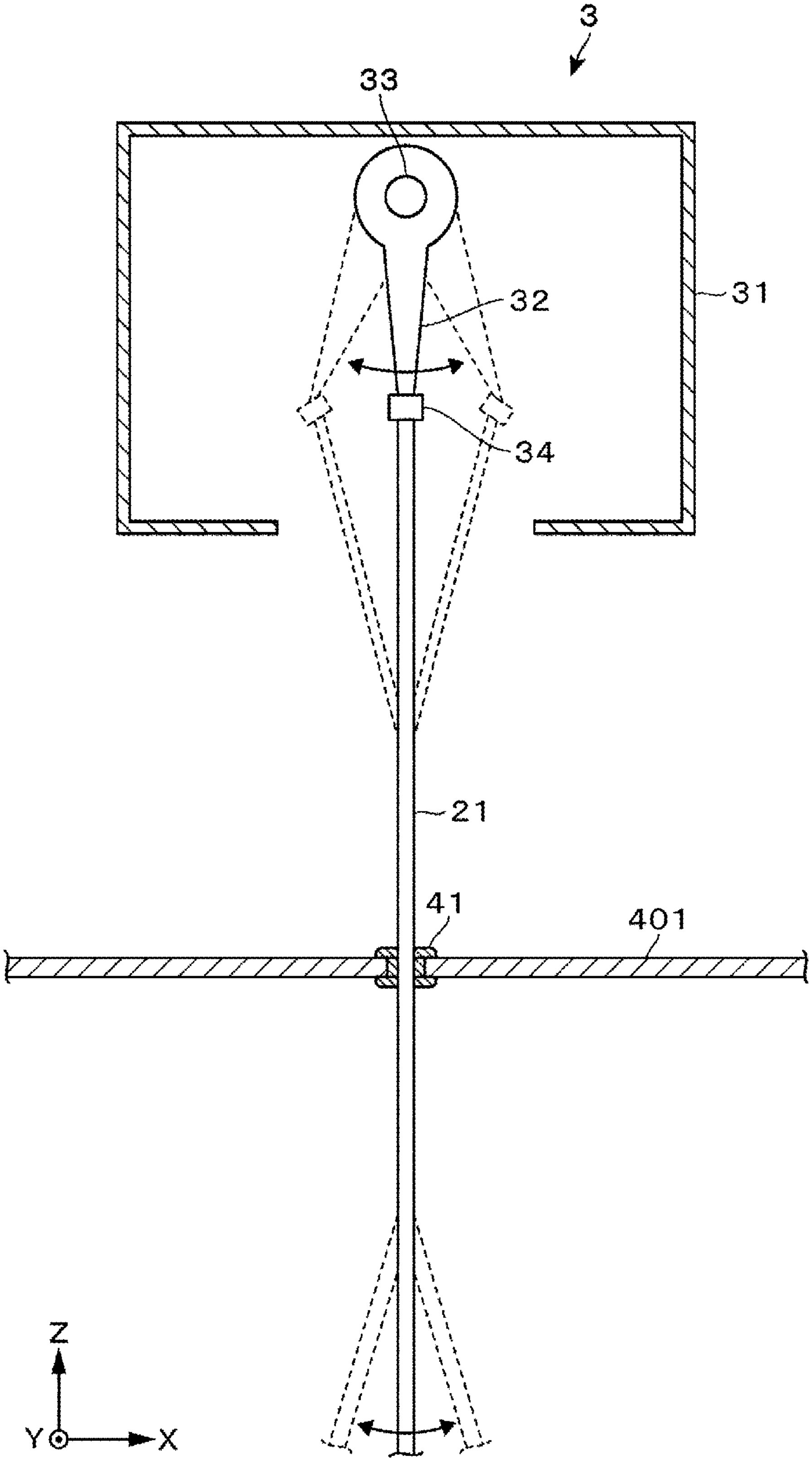
FIG. 6 is a longitudinal cross-sectional side view showing a configuration example of a vibration applier.

FIG. 6 shows an example of an internal configuration of the vibration applier 3. The vibration applier 3 in this example is configured to include, in a common casing 31, a rotational shaft 33 configured to reciprocate at a preset angle by a motor (not shown), a vibrator 32 form to protrude from the rotational shaft 33 toward the upper end portion of the support rod 21, and a connector 34 that connects a lower end portion of the vibrator 32 to the upper end portion of the support rod 21.

When a reciprocating vibration is applied to the upper end portion of the support rod 21 in a direction (direction indicated by a dashed arrow in FIGS. 3A and 3B) intersecting a plate surface of the fin 2 using the vibration applier 3 configured as above, the vibration is transmitted to the fin 2 in the tank 4 via the support rod 21. As a result, the fin 2 may reciprocate in the tank 4 in the direction intersecting the plate surface of the fin 2.

The vibration applied to the fin 2 by the vibration applier 3 is not limited to the example of the reciprocating vibration. For example, as in the fins 2*a* and 2*b* shown in FIGS. 4A to 5B, the fin member 20 may be provided so as to radially expand from the central axis C along the support rod 21. In this case, as shown in FIG. 4B and FIG. 5B, the reciprocating vibration may be applied so that the support rod 21 precesses, thus applying a moment in a direction that rotates the fin member 20.

<Vibration Detector>

When the vibration is applied to the fin 2 by the vibration applier 3, a wave is formed on the surface of the liquid L stored in the tank 4. The tank 4 is provided with a vibration detector configured to detect the vibration when the wave propagates and reaches an inner wall surface of the tank 4. As shown in FIG. 2, the vibration detector of this example includes a linear piezoelectric element 51 as a sensor attached on an outer wall surface of a sidewall portion 402 of the tank 4 to detect the vibration of the tank, and a signal outputter 52 configured to output a digital signal indicating a magnitude of a voltage output from the linear piezoelectric element 51.

The linear piezoelectric element 51 detects the vibration of the sidewall portion 402 and serves to output the same as a change in voltage. As the linear piezoelectric element 51, a known element called a piezoelectric wire or a piezoelectric cable may be used. The linear piezoelectric element 51 is provided so as to extend in a vertical direction to correspond to the arrangement area of the fin 2 in the tank 4.

In this case, the linear piezoelectric element 51 may be arranged in a straight line in the vertical direction along the depth direction of the liquid L in the tank 4. In addition, for example, when the linear piezoelectric element 51 is provided to correspond to the arrangement area of the fin 2 in the tank 4 of a cylindrical shape, the linear piezoelectric element 51 may be wound in a coil shape along an outer wall surface of the tank 4. FIG. 2 shows the former arrangement example. In this way, the linear piezoelectric element 51 attached along the outer wall surface of the linear piezoelectric element 51 of the tank 4 is connected to the signal outputter 52 via an electric cable.

<Controller 10>

As shown in FIGS. 1 and 2, the wafer processing system 1 includes a controller 10. The controller 10 is constituted with a storage storing a program, a memory, and a computer including a CPU. The program incorporates instructions (steps) for outputting a control signal from the controller 10 to each part of the wafer processing system 1 and for executing loading/unloading and processing of the wafer W. The program is stored in a storage of the computer, for example, a flexible disk, a compact disc, a hard disk, a magneto-optical (MO) disk, a non-volatile memory or the like, and is read from the storage and installed in the controller 10.

Here, the controller 10 functions as a liquid level identifier configured to identify the level of the liquid L in the tank 4, based on a correspondence relationship between the magnitude of the amplitude of the vibration detected by the vibration detector (including the linear piezoelectric element 51 and the signal outputter 52) and the width dimension of the fin 2. A specific method for identifying the liquid level will be described with reference to FIGS. 7 to 11 together with the operation of the fin 2 or the linear piezoelectric element 51.

<Action>

Figure 7:
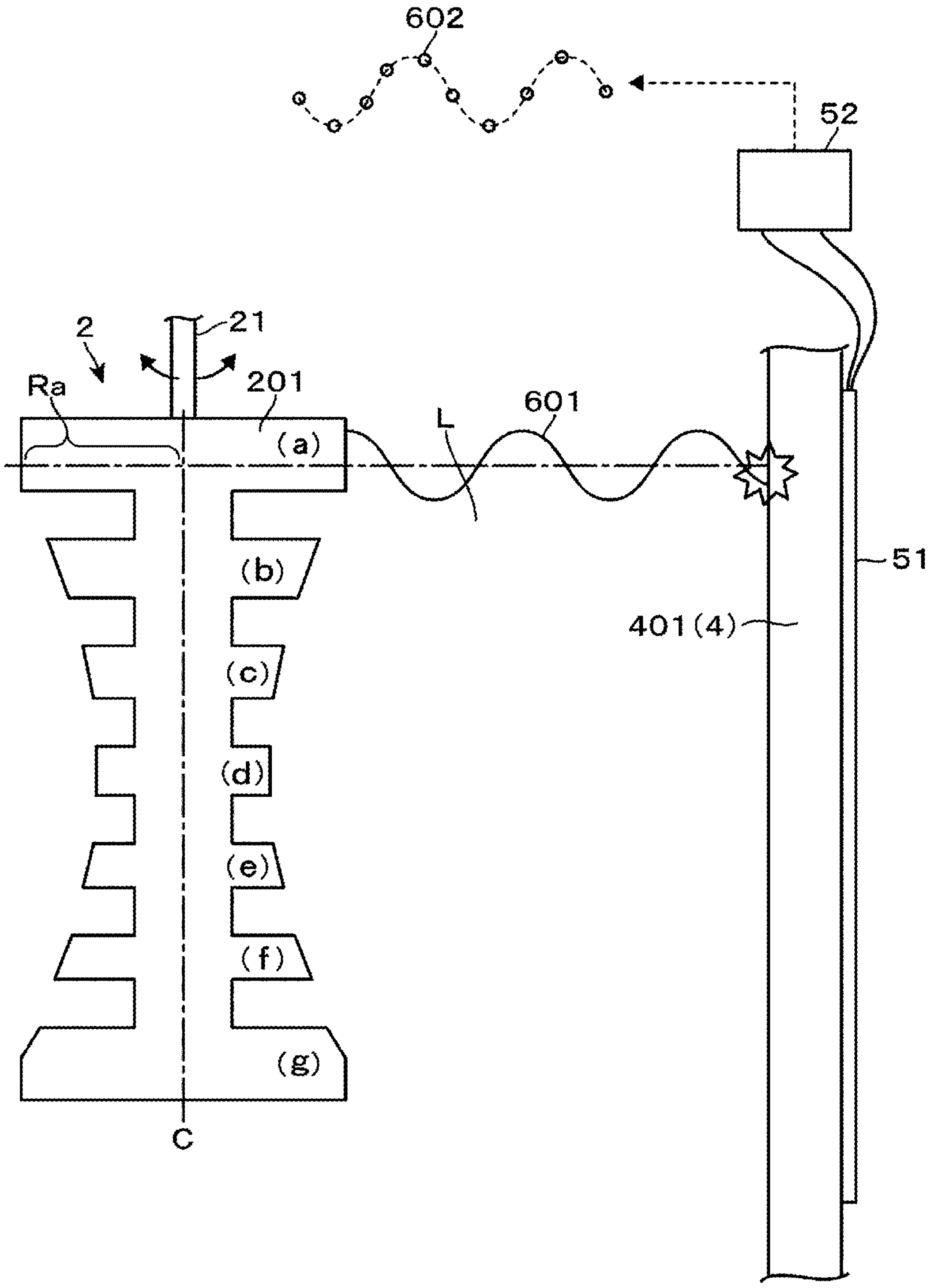
FIG. 7 is a first explanatory diagram showing an operation of identifying the level of liquid.
Figure 8:
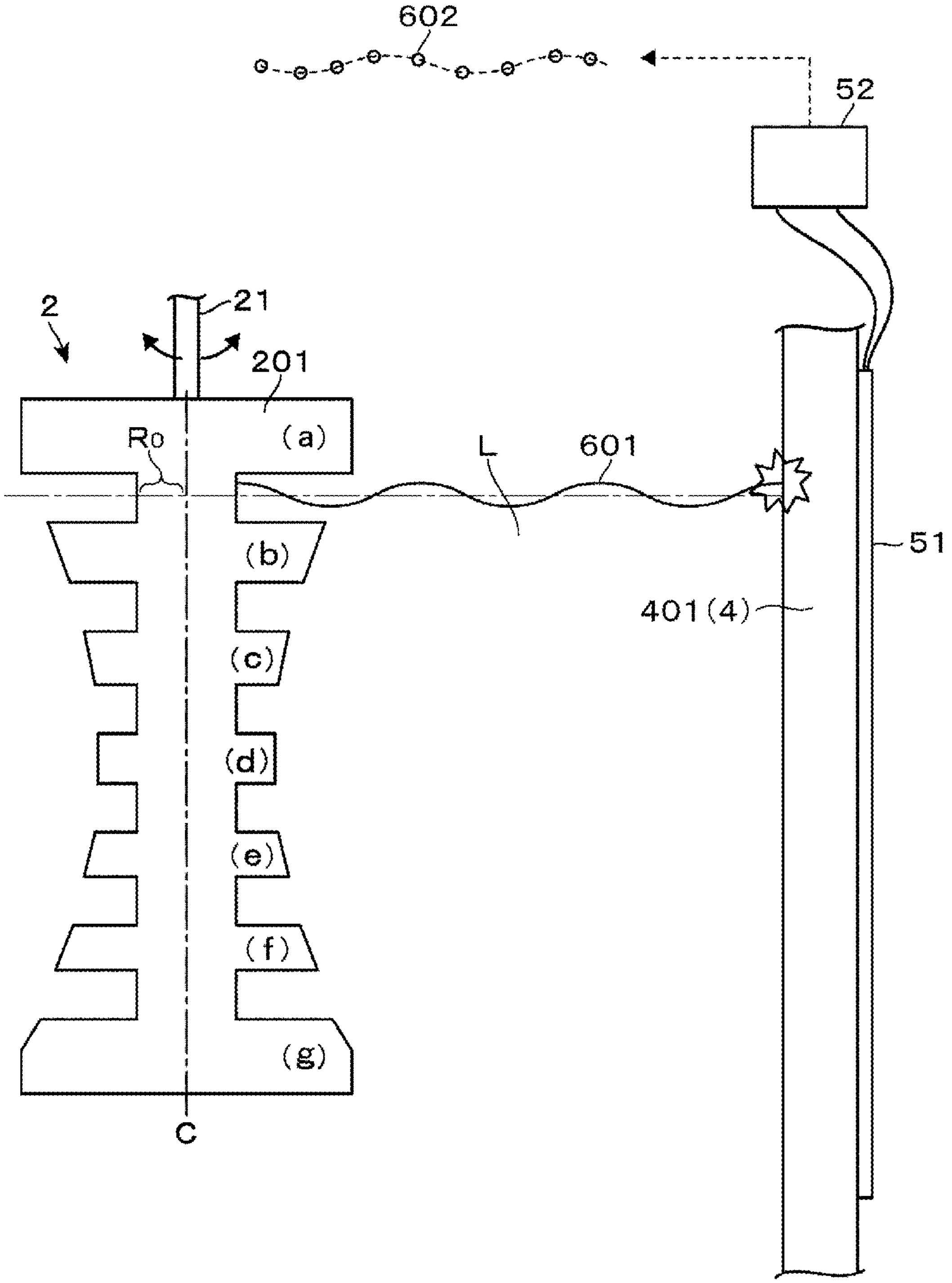
FIG. 8 is a second explanatory diagram showing an operation of identifying the level of liquid.
Figure 9:
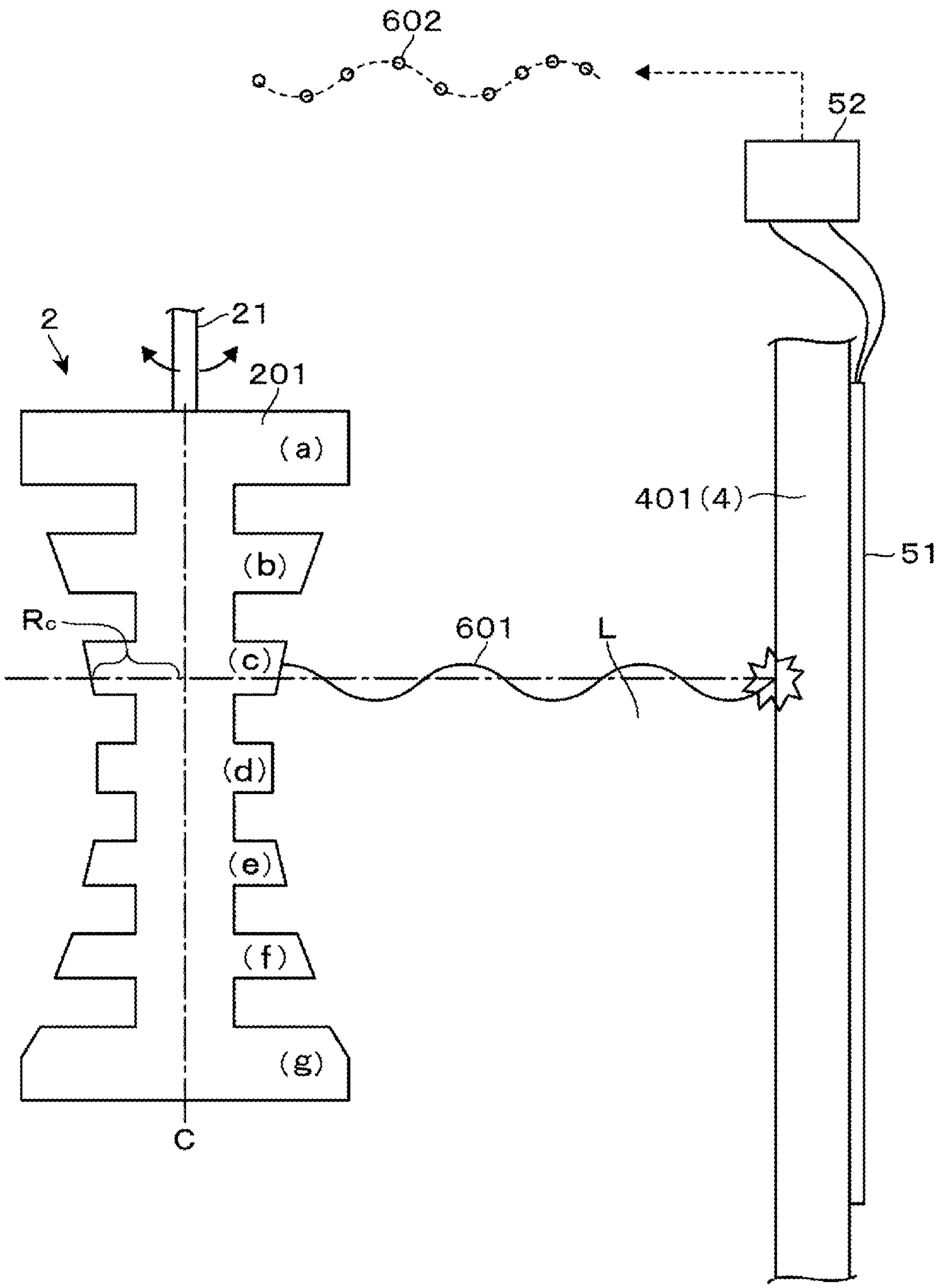
FIG. 9 is a third explanatory diagram showing an operation of identifying the level of liquid.

FIGS. 7 to 9 schematically show a gradual decrease in the level of the liquid L stored in the tank 4 of the raw material liquid storage device 11. In these figures, a dash-single dotted line indicates a stationary level of the liquid L when no vibration is applied to the fin 2.

For example, in FIG. 7, the level of the liquid L is at a height position corresponding to the portion (a) of the convex portions 201 of the fin 2. In this case, when a vibration is applied to the fin 2 via the support rod 21, a surface of the liquid L stirs by the portion (a) of the convex portions 201 so that a wave 601 as schematically shown by a solid line is formed on the surface of the liquid L. When the wave 601 propagates along the surface of the liquid L and reaches an inner wall surface of the sidewall portion 402 of the tank 4, the vibration is applied to the sidewall portion 402 from the wave 601. This vibration is converted into a voltage by the linear piezoelectric element 51, and the converted voltage is output to the signal outputter 52.

The signal outputter 52 outputs a digital signal 602 corresponding to a change in the voltage input from the linear piezoelectric element 51. In this case, the change in the voltage input from the linear piezoelectric element 51 occurs when the wave 601 formed on the surface of the liquid L vibrates the sidewall portion 402. Thus, the digital signal 602 output from the signal outputter 52 is a signal having a frequency and an amplitude corresponding to the wave 601. Therefore, by interpreting the digital signal 602 output from the signal outputter 52, it is possible to check a state of the wave 601 formed on the surface of the liquid L in the tank 4.

On the other hand, as described above, the fin 2 is configured such that the width dimension thereof in the direction (horizontal direction) intersecting the liquid level of the liquid L varies according to a position in the depth direction of the liquid L. When a vibration is applied to the fin 2 configured as above via the support rod 21, stirring force based on a moment of a magnitude corresponding to the width dimension of the fin 2 (the fin member 20) (which coincides with a distance R from the support rod 21 (the central axis C) in this example) is applied to the surface of the liquid L.

For example, at the liquid level shown in FIG. 7, the largest stirring force is applied by the convex portion 201 with a width dimension Ra. Thereafter, for example, when the liquid L is consumed and the liquid level is lowered to a middle position between the portion (a) of the convex portions 201 and the portion (b) of the convex portions 201 as shown in FIG. 8, a width dimension $R_0$ of the fin 2 becomes the smallest, and the stirring force that stirs the surface of the liquid L also becomes the smallest. When the liquid level is further lowered to a position shown in FIG. 9, stirring is performed by the portion (c) of the convex portions 201 having a width dimension $R_c$ smaller than that of the portion (b) of the convex portions 201 and larger than that of the portion (d) of the convex portions 201.

Figure 10:
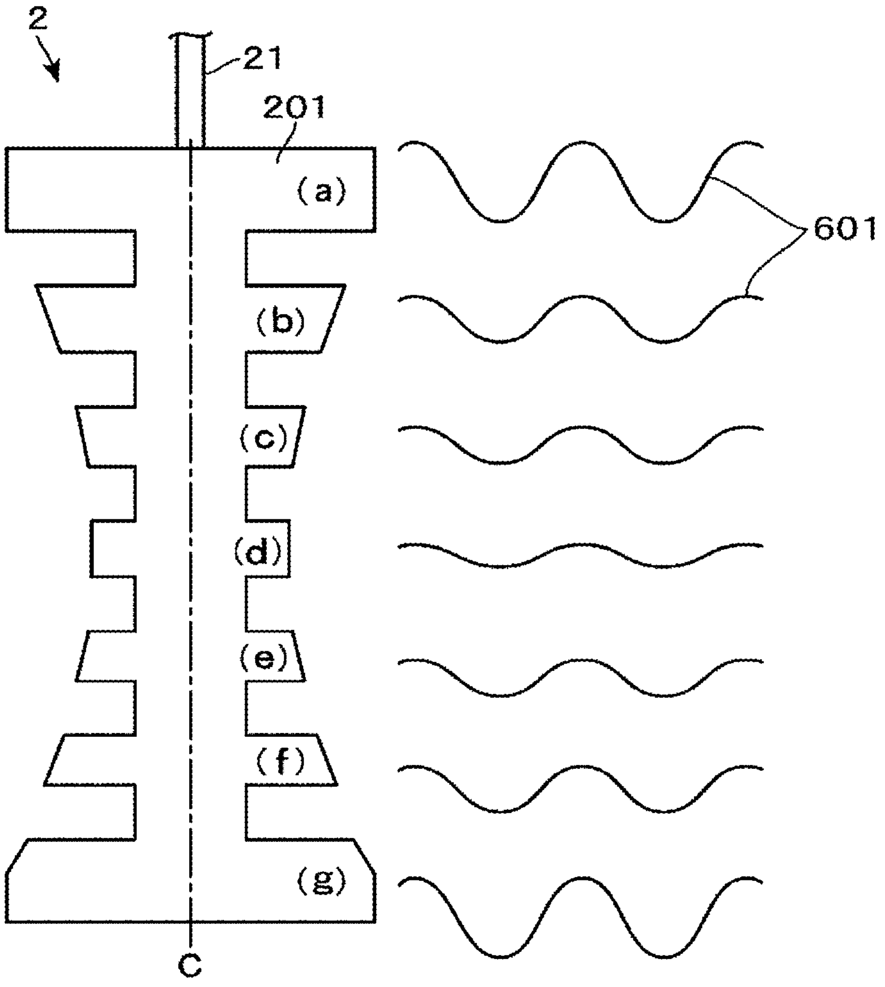
FIG. 10 is a schematic diagram showing the relationship between a width dimension of a convex portion of a fin and the magnitude of an amplitude.

In this way, when different stirring forces are applied according to the depth of the liquid L, the amplitude of the wave 601 formed on the surface of the liquid L varies. That is, the wave 601 with a large amplitude is formed at a height position at which the convex portion 201 with a large width dimension R is arranged. On the other hand, the wave 601 with a small amplitude is formed at a height position at which the convex portion 201 with a small width dimension R is arranged. FIG. 10 schematically shows a change in the magnitude of the amplitude of the wave 601 formed when the level of the liquid L is at height positions corresponding to the portions (a) to (g) of the convex portions 201.

Then, the digital signal 602 having an amplitude corresponding to the amplitude of the wave 601 is output from the signal outputter 52. Therefore, the level of the liquid L in the tank 4 may be identified based on a correspondence relationship between the magnitude of the amplitude of the digital signal 602 output from the signal outputter 52, that is, the magnitude of the amplitude of the vibration of the sidewall portion 402, and the width dimension R of the fin 2.

In practice, the wave 601 in the tank 4 has a complex waveform due to a position at which the wave 601 is formed by the fin 2, a propagation direction of the wave 601, a distance between a position at which the wave 601 is formed and the sidewall portion 402, formation of a reflected wave of the wave 601 on the inner wall surface of the sidewall portion 402, and the like. On the other hand, the frequency of the vibration applied from the vibration applier 3 may be recognized in advance. Thus, in the configuration shown in FIG. 2, only the fin 2 applies the greatest force to the surface of the liquid L.

Therefore, a component of a wave having a frequency common to the vibration applied from the vibration applier 3 and having the largest amplitude may be extracted from the digital signal 602 output from the signal outputter 52 using, for example, a filter. By such signal processing, the digital signal 602 corresponding to the wave 601 formed by the fin 2 may be obtained as schematically shown in FIGS. 7 to 9.

For the sake of convenience in description, the frequency of the vibration applied from the vibration applier 3 to the fin 2 is constant, but the frequency of the vibration applied to the fin 2 may vary from the viewpoint of detecting the magnitude of the amplitude.

In addition, for example, when a tip of the carrier gas supply line 101 is inserted into the liquid L to obtain the processing gas by bubbling, another force that forms the wave 601 on the surface of the liquid L is applied in addition to the vibration of the fin 2. In this case, the level of the liquid L may be identified by, for example, stopping the bubbling and vibrating the fin 2 during a period when the processing gas is not supplied.

Figure 11:
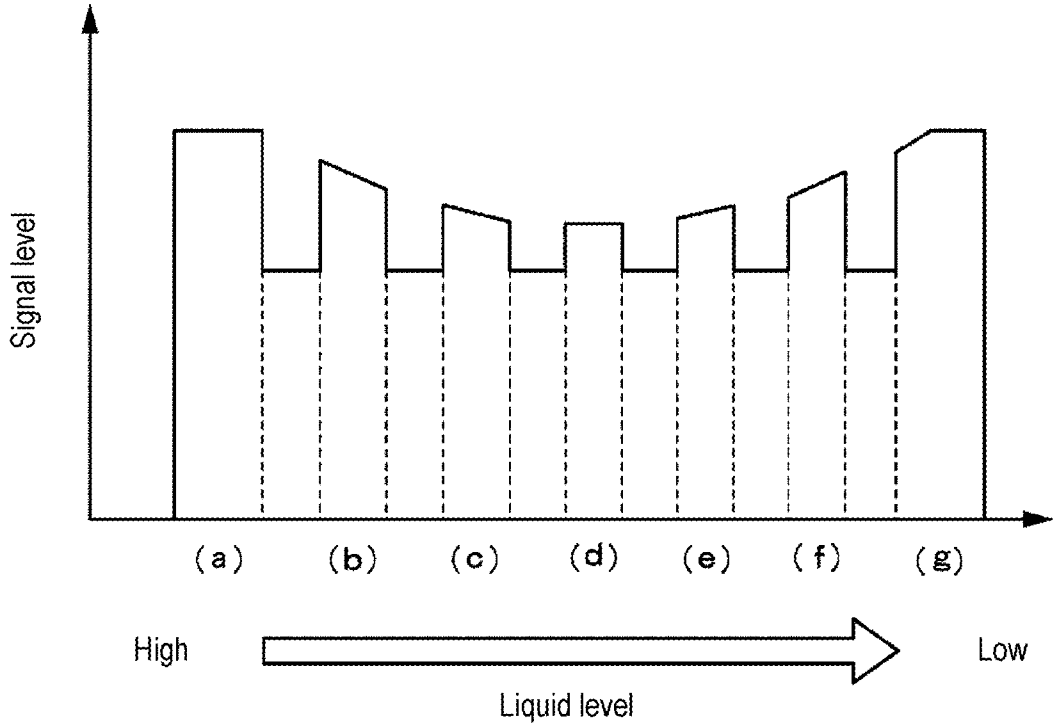
FIG. 11 is a graph showing a correspondence relationship between a liquid level and an amplitude level of a detected vibration.

FIG. 11 schematically shows a change in a signal level of the digital signal 602 when the level of the liquid L is gradually lowered in the raw material liquid storage device 11 shown in FIG. 2. As described above, the signal level of the digital signal 602 corresponds to the amplitude of the wave 601 formed by the vibration of the fin 2. In this case, as shown in FIG. 11, the amplitude of the wave 601 formed on the surface of the liquid L by the fin 2 varies with the width dimension R of the fin 2 when viewed in the depth direction of the liquid L.

Therefore, for example, the controller 10 acquires the change in the signal level of the digital signal 602 over time from the signal outputter 52 to identify the level of the liquid L based on a correspondence relationship with the shape of the fin 2 that is recognized in advance. In this respect, the controller 10 constitutes the liquid level identifier of the present disclosure.

Due to a change in an actually-detected signal level of the digital signal 602, resolution of the actually-detected signal level may be lower than that exemplified in FIG. 11. Even in such a case, by arranging the convex portions 201 at intervals in the depth direction of the liquid L, the liquid levels corresponding to the portions (a) to (g) and liquid levels of other portions may be digitally identified.

Based on the identified level of the liquid L in the tank 4, a timing of replacing the tank 4 may be checked in advance or the operation of the wafer processing system 1 may be controlled according to the level of the liquid L.

In particular, the fin 2 described with reference to FIG. 2 is configured such that the amplitude of the wave 601 is maximized in the portions (a) and (g) of the convex portions 201, which respectively correspond to the upper limit position and the lower limit position of the depth of the liquid L. With this configuration, when the level of the liquid L approaches the upper or lower limit position, the signal level of the digital signal 602 also becomes maximum. Thus, the fin 2 may also function as an alarm.

The raw material liquid storage device 11 of the present disclosure provides the following effects. Since the level of the liquid L in the tank 4 is identified based on the vibration applied to the liquid L from the fin 2, the vibration may be detected from the outer wall surface of the sidewall portion 402. As a result, unlike a float type sensor, the liquid level may be measured without inserting a device that inputs and outputs an electric signal into the liquid L.

<Variation>

Figure 12:
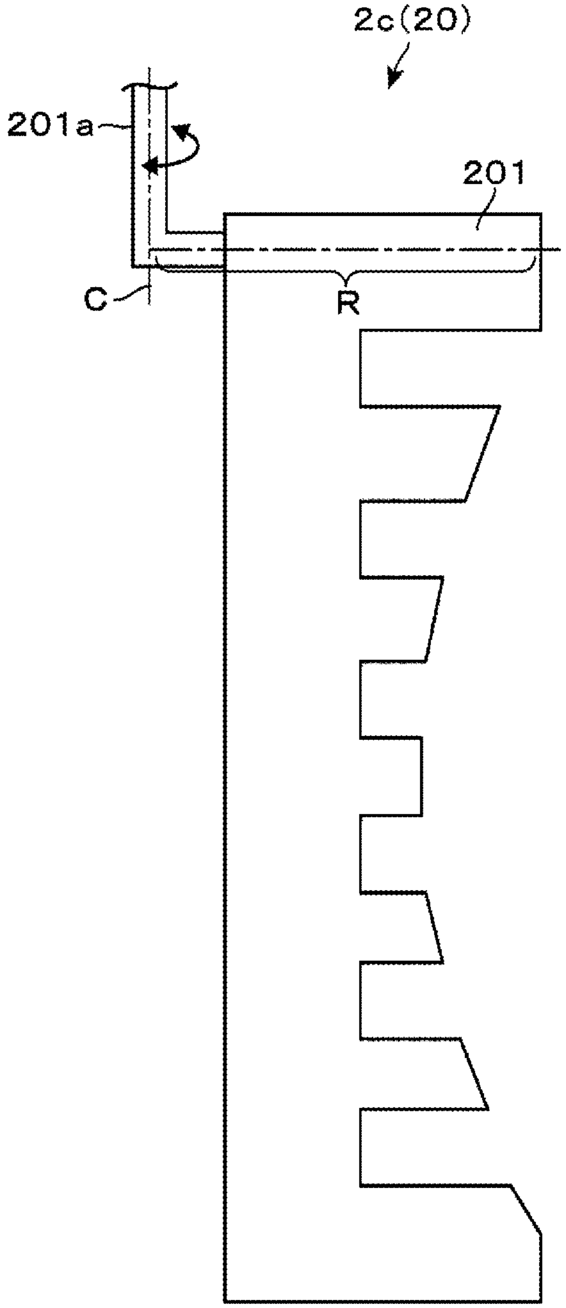
FIG. 12 is a first explanatory diagram showing another configuration of a fin.
Figure 13:
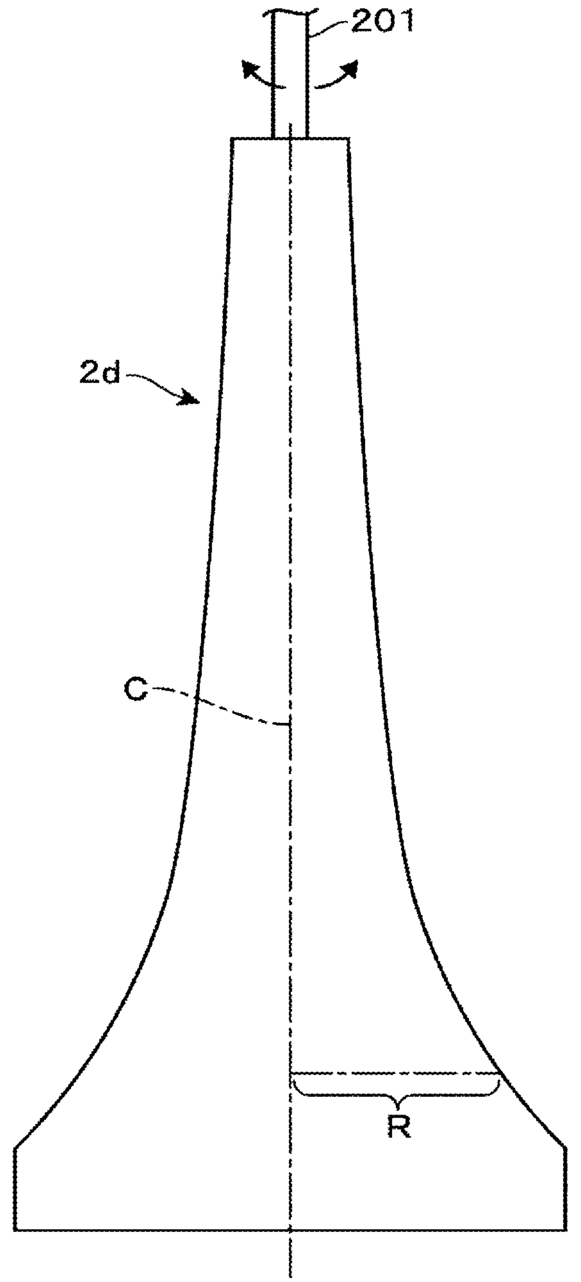
FIG. 13 is a second explanatory diagram showing another configuration of a fin.

Instead of the fins 2, 2*a*, and 2*b* configured as described with reference to FIGS. 2 to 5, as shown in FIG. 12, a fin 2*c* including only one fin member 20 may be provided. Further, the arrangement of the plurality of convex portions 201 at intervals is not essential. For example, as shown in FIG. 13, a fin 2*d* may be configured to have a continuously-varying width dimension. FIG. 13 shows an example of the fin 2*d* in which the amplitude of the wave 601 increases as the level of the liquid L decreases.

FIG. 12 shows a configuration in which the support rod 21 holds the fin 2*c* from a side thereof. In addition, the support rod 21 may be inserted into the tank 4 from a bottom of the tank 4 and may support the fin 2 (2*a*, 2*b*, 2*c* or 2*d*) from a lower end thereof.

In the example shown in FIG. 2, the linear piezoelectric element 51 has been described to be provided to correspond to the arrangement area of the fin 2, but a configuration example of the sensor configured to detect the vibration of the sidewall portion 402 is not limited thereto. For example, a plurality of small patch-shaped piezoelectric elements or microelectromechanical systems (MEMS) type acceleration sensors may be provided to correspond to the height positions of the convex portions 201, respectively. These piezoelectric elements or acceleration sensors are connected in parallel to the common signal outputter 52. Even if the plurality of piezoelectric elements or acceleration sensors are recognized, any one of the convex portions 201 forming a wave according to the magnitude of an amplitude of a detected vibration may be identified. This is the same as described with reference to FIGS. 7 to 11.

In addition, the sensor such as the linear piezoelectric element 51 is not limited to being attached to the outer wall surface of the sidewall portion 402. For example, the linear piezoelectric element 51, the patch-shaped piezoelectric element, or the acceleration sensor may be embedded in the sidewall portion 402.

Further, the raw material liquid storage device 11 is not limited to being applied to the wafer processing system 1 configured to vaporize the liquid L, which is a raw material of the processing gas, and supply the same to the wafer processor 12. For example, the raw material liquid storage device 11 of the present disclosure may be applied to a wafer processing system that performs liquid processing by supplying the liquid L stored in the tank 4 directly to the wafer W.

It should be noted that the embodiments disclosed herein are exemplary in all aspects and are not restrictive. The above-described embodiments may be omitted, replaced, or modified in various forms without departing from the scope and spirit of the appended claims.

EXPLANATION OF REFERENCE NUMERALS

L: liquid, W: wafer, 11: raw material liquid storage device, 2, 2*a* to 2*d*: fin, 51: linear piezoelectric element

What is claimed is:

1. A device for storing a liquid used to process a substrate, the device comprising:

a tank configured to store the liquid;

a fin inserted into the tank and configured such that a width dimension of the fin in a direction intersecting a liquid surface of the liquid varies according to a position of a depth direction of the liquid;

a vibration applier configured to apply a vibration to the fin;

a vibration detector configured to detect the vibration when a wave formed on the surface of the liquid reaches an inner wall surface of the tank by the fin to which the vibration is applied from the vibration applier; and a liquid level identifier configured to identify a liquid level of the liquid in the tank based on a correspondence relationship between a magnitude of an amplitude of the vibration detected by the vibration detector and the width dimension of the fin.

2. The device of claim 1, wherein the fin has a plurality of convex portions, which are regions having increased width dimensions compared to other regions, and wherein the plurality of convex portions is arranged at intervals in the depth direction of the liquid.

3. The device of claim 1, wherein the fin is supported by a support rod which penetrates a ceiling plate provided on an upper surface of the tank and is inserted into the tank while being fixed to the ceiling plate, and wherein the vibration applier is configured to apply the vibration to the fin via a portion of the support rod which extends outward of the tank.

4. The device of claim 3, wherein the fin includes a plurality of fin members having congruent shapes with respect to each other, and wherein the plurality of fin members is arranged at intervals around a central axis of the support rod.

5. The device of claim 1, wherein the vibration detector includes a sensor provided on an outer wall surface of the tank.

6. The device of claim 5, wherein the sensor is a linear piezoelectric element provided to extend in the depth direction of the liquid.

7. A system for processing a substrate, the system comprising:

the device of claim 1; and a substrate processor configured to perform processing on the substrate using the liquid stored in the tank.

8. The system of claim 7, wherein the substrate processor performs the processing on the substrate using a processing gas obtained by vaporizing the liquid in the tank.

9. A method of identifying a liquid level of liquid used to process a substrate, the liquid being stored in a tank, the method comprising:

applying a vibration to a fin inserted into the tank, the fin being configured such that a width dimension of the fin in a direction intersecting a liquid surface of the liquid varies according to a position of a depth direction of the liquid;

detecting the vibration when a wave formed on the liquid surface of the liquid reaches an inner wall surface of the tank by the fin to which the vibration is applied; and identifying the liquid level of the liquid in the tank based on a correspondence relationship between a magnitude of an amplitude of the vibration detected in the detecting and the width dimension of the fin.

10. The method of claim 9, wherein the fin has a plurality of convex portions, which are regions having increased width dimensions compared to other regions, and wherein the plurality of convex portions is arranged at intervals in the depth direction of the liquid.

11. The method of claim 9, wherein the fin is supported by a support rod which penetrates a ceiling plate provided on an upper surface of the tank and is inserted into the tank while being fixed to the ceiling plate, and wherein, in the applying the vibration to the fin, the vibration is applied to the fin via a portion of the support rod which extends outward of the tank.

12. The method of claim 9, wherein the detecting the vibration includes detecting the vibration from an outer wall surface of the tank.

* * * * *